United States Patent
McKeown et al.

(10) Patent No.: US 11,724,819 B2
(45) Date of Patent: Aug. 15, 2023

(54) METHOD AND SYSTEM FOR ASSESSING AIRCRAFT LANDING AND SURFACE MOVEMENT PERFORMANCES

(71) Applicant: EAGLE AEROSPACE, LTD., Campbellford (CA)

(72) Inventors: Stephen Lyle McKeown, Campbellford (CA); Zindine Souiki, Brampton (CA); Ty Shattuck, Burlington (CA); Richard Thibodeau, Campbellford (CA); Paul Edward Cudmore, Castleton (CA); Daniel Thomas Savery, Hastings (CA)

(73) Assignee: EAGLE AEROSPACE LTD., Campbellford (CA)

( * ) Notice: Subject to any disclaimer, the term of this patent is extended or adjusted under 35 U.S.C. 154(b) by 503 days.

(21) Appl. No.: 16/710,020

(22) Filed: Dec. 11, 2019

(65) Prior Publication Data

US 2020/0180781 A1    Jun. 11, 2020

Related U.S. Application Data

(60) Provisional application No. 62/777,907, filed on Dec. 11, 2018.

(51) Int. Cl.
*B64D 45/08* (2006.01)
*B64D 43/00* (2006.01)

(52) U.S. Cl.
CPC ............. *B64D 45/08* (2013.01); *B64D 43/00* (2013.01)

(58) Field of Classification Search
CPC ................................ B64D 45/08; B64D 43/00
See application file for complete search history.

(56) References Cited

U.S. PATENT DOCUMENTS

| 4,122,522 | A | 10/1978 | Smith |
| 2007/0018834 | A1* | 1/2007 | Rasmussen ............. G01W 1/02 340/601 |
| 2009/0125168 | A1 | 5/2009 | Voisin |
| 2010/0070115 | A1 | 3/2010 | Villaume |

(Continued)

FOREIGN PATENT DOCUMENTS

WO    03/107299 A2    12/2003

OTHER PUBLICATIONS

Federal Aviation Administration; System Wide Information Management (SWIM); Oct. 2015 (cited in the specification as Appendix A).

(Continued)

*Primary Examiner* — Vivek D Koppikar
*Assistant Examiner* — Jeffrey R Chalhoub
(74) *Attorney, Agent, or Firm* — Pearne & Gordon LLP

(57) ABSTRACT

A method for detecting and reporting anomalies in operation of an aircraft. The method including the steps of: receiving real time data indicative of the operation of the aircraft, the real time data including at least one of the following parameters: ground speed, rate of deceleration of the aircraft, touchdown location, aircraft route, timing of aircraft route, ground movement activities and a maximum landing distance; based on the collected real time data, calculating a predicted performance of the aircraft, and alerting an operator when the predicted performance is outside of an acceptable performance for the aircraft.

9 Claims, 4 Drawing Sheets

(56) References Cited

U.S. PATENT DOCUMENTS

2013/0261855 A1 10/2013 Degagne et al.
2014/0257603 A1* 9/2014 McKeown ........... G08G 5/0021
   701/16
2017/0183086 A1 6/2017 Le-Bouedec et al.

OTHER PUBLICATIONS

Federal Aviation Administration; NAS Enterprise Architecture—Infrastructure Roadmaps Version 11.1; Apr. 2017.
Federal Aviation Administration; Operational Performance Assessment; Sep. 2015.
Federal Aviation Administration; System Wide Information Management (SWIM)—How to Get Connected; (https://www.faa.gov/nextgen/programs/swim/products/getConnected/; last visited Sep. 18, 2017).
Federal Aviation Administration; External Consumer Access to FAA Data via SWIM; FAA Communications Information & Network Programs Group (CINP); Mar. 2017.
International Search Report and Written Opinion dated Feb. 27, 2020 for corresponding International Application No. PCT/CA2019/051785.
Boeing 737 Technical Guide, Landing Gear, http://www.b737.org.uk/landinggear.htm; last visit Dec. 10, 2019; cited on p. 2 of the specification.
Extended European Search Report for related European Patent Application No. 19895526.2 dated Nov. 23, 2022.

* cited by examiner

METHOD AND SYSTEM FOR ASSESSING AIRCRAFT LANDING AND SURFACE MOVEMENT PERFORMANCES

CROSS-REFERENCE TO RELATED APPLICATIONS

The present application claims priority to U.S. Provisional Patent Application No. 62/777,907, entitled "METHOD AND SYSTEM FOR ASSESSING AIRCRAFT LANDING AND SURFACE MOVEMENT PERFORMANCES" and filed on Dec. 11, 2018, the entirety of which is herein incorporated by reference.

FIELD OF THE INVENTION

This invention relates to an aircraft landing procedure tracking and reporting system, and in particular to a system and method for comparing observed landing performance and a simulated, anticipated, or templated landing performance.

BACKGROUND OF THE INVENTION

Landing Procedure

Generally, aircraft land on a runway constructed of asphalt pavement, concrete pavement, gravel, grass, and or other desired construction material. To land, the velocity of the aircraft is reduced to allow for touchdown, which is the moment of contact between the landing aircraft and the runway. The aircraft will then decelerate due to both aerodynamic forces, such as speed brakes and reverse thrust, and mechanical forces, like wheel brakes, while traveling along the middle of the runway until the aircraft reaches a lower taxiing and or exiting velocity and completes the landing and exiting from the runway. To prevent a runway excursion, the aircraft should decrease its velocity to safe taxiing or exiting velocity before running out of runway to prevent an overrun excursion, and maintain longitudinal directional control to prevent a veer-off excursion.

Runway Surface Condition Assessment

A runway excursion occurs when an airplane veers off or overruns a runway surface. Runway contamination can be a common contributor to runway excursions. According to the Federal Aviation Administration (FAA), a runway is contaminated when more than 25 percent of the runway surface area (within the reported length and the width being used) is covered by frost, ice, and or any depth of snow, slush, or water.

Determining runway surface conditions that influence aircraft wheel braking and directional control is very challenging. Visual observations can often not be enough to provide accurate assessment of aircraft anti-skid braking systems braking availability, and or directional controllability in adverse wind conditions. Being able to spot anomalies in actual aircraft landing data would provide real time data to Airport Operations Teams and allow them to be both reactive and proactive when the conditions are changing rapidly and or are wrongly assessed.

Autobrake

An autobrake is a type of automatic computer-controlled brake system used on airplanes during the landing procedure. See, FIG. 1. Generally, when landing on a contaminated runway, the autobraking system is armed to engage after an aircraft's landing and nose gear have sensed weight on wheels.

The autobrake is available to pilots to help them slow the plane at a variety of set rates of deceleration/braking. Generally, the settings are selectable by a pilot before the landing procedure begins. For example, the settings can include a "1" or "LO" referring to a respectively low deceleration rate, a higher number or a 'Hi' or a "MAX" referring to a respectively higher deceleration rate, and any preferred number of intermediate settings between the two. The rate of deceleration is defined as the rate at which an object slows down (i.e. deceleration=(final velocity−initial velocity)/time). See a sample autobrake control device 10 in FIG. 1.

For example, on a Boeing 737, the autobrakes selections on landing are as follows:

| Autobrake Setting | Deceleration Rate | In m/s/s | In fraction of 1 g (9.81 m/s/s) |
|---|---|---|---|
| 1/1250 PSI | 4 ft/s$^2$ | 1.22 m/s$^2$ | 0.12 g |
| 2/1500 PSI | 5 ft/s$^2$ | 1.52 m/s$^2$ | 0.16 g |
| 3/2000 PSI | 7.2 ft/s$^2$ | 2.13 m/s$^2$ | 0.22 g |
| Max/3000 PSI | 12 ft/s$^2$ (<80 kts) | 3.66 m/s$^2$ | 0.37 g |
|  | 14 ft/s$^2$ (>80 kts) | 4.27 m/s$^2$ | 0.44 g |

(source: http://www.b737.org.uk/landinggear.htm)

Surface Movement Event Service

In the United States, a Surface Movement Event Service (SMES) is a service that is part of the System Wide Information Management (SWIM) framework implemented by the Federal Aviation Administration (FAA). SWIM is an information-sharing platform designed to facilitate an increased common situational awareness and a sharing of Air Traffic Management (ATM) system information. See Appendix A for a detailed discussion of how SWIM operates. This document is hereby incorporated herein by reference. SWIM is replacing unique system interfaces with a single point of connection for each user to receive multiple data products. The SWIM framework can include a SWIM Terminal Data Distribution System (STDDS) that converts raw surface data collected from airport towers into easily accessibly information which is published via a National Airspace System (NAS) Enterprise Messaging Service (NEMS).

The STDDS includes the SMES information. The SMES can provide surface movement event messages, Airport Surface Detection Equipment, Model X (ASDE-X) position report messages, generic flight plan information including aircraft identification, and ASDE-X system status messages for a specific airport. The data used by ASDE-X can come from multiple sources including: Airport Surveillance Radar (ASR); Surface Movement Radar (SMR); Multilateration (MLAT); and Automatic Dependent Surveillance-Broadcast (ADS-B). ADS-B can provide an aircraft's GPS location, altitude, velocity, and other data. Global aircraft ADS-B data may now also become available from other Air Navigation Services Providers like NAV CANADA and include data gathering and communication of data from sources like Aireon, a global coverage network of satellites that collect and communicate ADS-B data.

This service also provides a message when an aircraft touches the ground.

Similar services and systems exist in other countries and will be utilized in similar fashion.

BRIEF SUMMARY

Runway condition assessment is a complex task. The present invention can observe existing sensor(s) and signal(s) data at major airports that indicate aircraft landing data, log the acquired data and analyze it in real time to detect anomalies in the landing performance of the aircraft. Anomalies are then reported to the Airport Operations Team and or the Airport Air Navigation Services Provider for further assessment and correction. The anomalies detected can be reported in real time or near real time to a user to alert, assess, verify, and correct if needed, runway conditions and or corrective pilot actions. Real time monitoring may allow tracking of fast changing conditions and prevent runway veer-off and or overrun excursions.

The present invention comprises a method and system to collect and analyze airport surface movement data to detect anomalies in the landings, decelerations and directional control of aircraft landing on runways.

In one non-limiting embodiment of the present invention, a software program and method captures surface movement events, logs them and analyzes them near real time to detect anomalies in the speed, landing distance and rate of deceleration of aircrafts. The software program or method may be configured to:

(a) Listen on all SMES or equivalent events,
(b) Detect when an aircraft landing gear touches down on the runway,
(c) Detect when an aircraft nose gear touches down on the runway,
(d) Detect the changing velocities of an aircraft as it lands and travels along the runway,
(e) Record the landing track of said aircraft,
(f) Analyze the recorded data to detect unexpected behavior,
(g) When such a behavior is detected, report it with location (Runway, Latitude, Longitude), time (in local time format) and Flight Identifier,
(h) Archive the recorded data and analyze data for trends indicating current time runway condition and or deteriorating runway conditions, deteriorating pavement conditions, and or changing, improving, or deteriorating efficiencies in aircraft movements on the airfield.

The software also analyzes aircraft ground movements to find dangers and or inefficiencies in the movement of aircraft around the airport and will alert the user to take corrective measures if they deem it appropriate. In another non-limiting embodiment of the present invention, the software will record the time from when aircraft leave a de-icing area to the time when they initiate takeoff. This can be shown in real time to give de-icing crews an indication of whether or not the allocated maximum holdover time for anti-icing chemicals has been or is likely to be exceeded before a then unsafe takeoff.

The present invention may provide a method for detecting and reporting anomalies during operation of an aircraft. The method may include the steps of: receiving real time data indicative of operation of the aircraft, the real time data including at least one of the following: ground speed, rate of deceleration of the aircraft, touchdown location, aircraft route, timing of aircraft route, ground movement activities and a maximum landing distance; based on the collected real time data, calculating a predicted performance of the aircraft, and alerting an operator when the predicted performance is outside of an acceptable performance for the aircraft.

In the foregoing method, the predicted performance may include at least one of the following: landing distance and an average rate of deceleration.

In the foregoing method, further a step of alerting the operator if the average rate of deceleration falls within, or outside expected parameters may be provided.

In the foregoing method, the step of alerting an operator includes at least one of the following: a color-coded range overlaid on a map to visually identify areas to be inspected/assessed, a Short Message Service (SMS) and or e-mail message.

In the foregoing method, the real time data includes at least one of the following: date, time, runway identification, aircraft brand, aircraft model, range of deceleration rate, range of landing distance, and a position of the aircraft on airport pavements/grounds.

In the foregoing method a step of storing at least one of the following: out of range rate of deceleration for the aircraft, aircraft type and expected range of deceleration rate, and aircraft ground movement anomalies may be provided.

In the foregoing method the real time data may include at least one of the following: wheel spin up on landing, aerodynamic flaps position, spoiler position, reverse thrust engagement time and intensity, and contaminant impingement on a land surface.

In the foregoing method the predicted performance may include aircraft landing stopping distances.

In the foregoing method the step of alerting an operator may include reporting possible increased stopping distances.

The present invention may also provide a software program for detecting and reporting anomalies during operation of an aircraft. The software program may be configured to: receive real time data indicative of operation of the aircraft, the real time data including at least one of the following: ground movement activities of the aircraft, historical data representative of acceptable range(s) of elapsed time between locations at an airport; based on the collected real time data, calculating a predicted elapsed time between two locations for the aircraft, and alerting an operator when the predicted elapsed time for the aircraft exceeds the acceptable range of elapsed time between the two locations.

In the foregoing software program, the step of alerting an operator may include continuous display of the predicted elapsed time proximate a displayed symbol representing the aircraft.

The present invention may further provide a method for detecting and reporting anomalies during operation of an aircraft. The method may include the steps of: receiving real time data indicative of operation of the aircraft, the real time data including at least one of the following: time for application of a de-icing chemical to an aircraft, ground movement activities of the aircraft; based on the collected real time data, calculating a predicted expiration time for the de-icing chemical and a predicted take-off time for the aircraft, and alerting an operator when the predicted take-off time for the aircraft exceeds the predicted expiration time for the de-icing chemical.

In the foregoing method, the step of alerting an operator may include continuous display of the predicted expiration time for the de-icing chemical proximate a displayed symbol representing the aircraft.

BRIEF DESCRIPTION OF THE DRAWINGS

Aspects of the present invention will become apparent to those skilled in the art upon reading the following description with reference to the accompanying drawings, in which.

DETAILED DESCRIPTION

Figure 1:
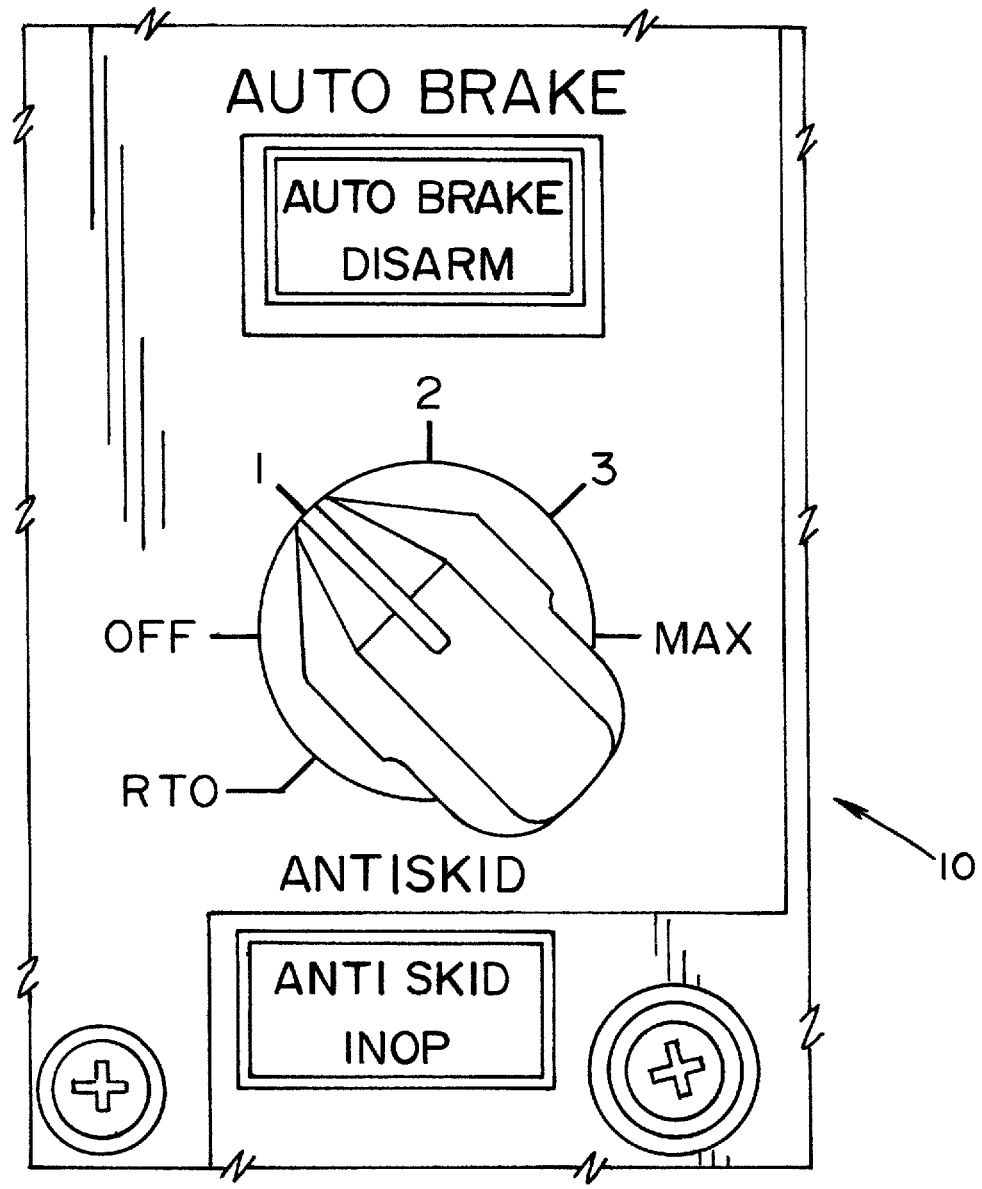
FIG. 1 illustrates a mechanism used to adjust autobrake settings.

Example embodiments that incorporate one or more aspects of the present invention are described and illustrated in the drawings. These illustrated examples are not intended to be a limitation on the present invention. For example, one or more aspects of the present invention can be utilized for other vehicles. Moreover, certain terminology is used herein for convenience only and is not to be taken as a limitation on the present invention. Still further, in the drawings, the same reference numerals are employed for designating the same elements.

Current improvement in the SWIM framework and global deployment of ADS-B data allows access to accurate and near real time global aircraft position and velocity data. Using an appropriate algorithm this data may allow the present invention to calculate a rate of deceleration each second and compare to a range of expected rates of deceleration as well as relevant historical data. This data also allows the present invention to measure and observe deviations in the anticipated deceleration rates and deviations in directional compliance along the runway and the distance covered to reach a safe taxiing speed, which would give a user insight information on the aircraft braking and directional control availability on the actual contaminated runway pavement surface conditions, as well as monitoring how any intentional or accidental operational changes are affecting aircraft ground movements.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the invention in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the invention.

In one embodiment, the present invention comprises a system that is connected to the SWIM or equivalent framework. The system can be connected to the SWIM framework via a cable network, a cellular network, a Wi-Fi network, and/or any other suitable connection system. Connection to the SWIM framework can grant a user access to the National Airspace System (NAS) Enterprise Messaging Service (NEMS) or equivalent. NEMS can provide multiple pieces of information that a user can select. In one embodiment, the present invention obtains SMES information from NEMS.

The system can be configured in one embodiment to obtain information about an aircraft after the aircraft touches down. In another embodiment, the system can be configured to obtain information about the aircraft before the aircraft touches down (i.e., prior to or during the landing procedure). The information about the aircraft can comprise the aircraft ID and the aircraft model/type from SMES and the actual autobrake settings of the aircraft. In one embodiment, the autobrake settings can be obtained from a sensor connected to the autobrake system on the airplane and is transmitted to this system. In another embodiment, the pilot manually enters the autobrake setting into a program connected to NEMS and is transmitted to this system. Any method of obtaining the autobrake setting consistent with the desired use is contemplated. In another embodiment, using machine learning and artificial intelligence within this system, an autobrake setting may be determined by the software as a landing takes place and velocities of the decelerating aircraft are observed.

The information about the aircraft can further include the GPS location and velocity of the aircraft. The velocity can separately indicate the horizontal velocity, vertical velocity, angular velocity, or any combination thereof. In one embodiment, the system uses the information from the aircraft to locate and log the position on the runway where the aircraft touches down simultaneously with the aircraft touching down. In another embodiment, the system collects the information related to the location and velocity of the aircraft during the landing procedure and logs the information after the aircraft has completed the landing procedure. It is further contemplated that the aircraft velocity could be calculated from a series of GPS location data provided by ADS-B, or by radar, or by other systems.

The system can also be configured to calculate an actual landing distance based on information from NEMS. In one embodiment, the system calculates by any known or devised method the distance from the point where the aircraft touches down to the point where the aircraft has completed either the deceleration to taxiing speed, or the complete landing procedure, either of which may be considered the landing distance. Any method for determining the actual deceleration to taxiing speed, or complete landing distance consistent with the desired use is considered.

The system can be configured to also calculate a simulated landing distance based on information from NEMS and/or other sources, like NAVCAN or Aireon. In one embodiment, the system is configured to calculate the simulated landing distance based on the aircraft model/type, an initial velocity of the aircraft, a chosen final velocity, and a chosen or system determined brake setting.

In one embodiment, the system is configured to calculate simulated deceleration of the aircraft incrementally throughout the landing and deceleration of the aircraft above taxiing speeds, by inputting, or by system determination, of the autobrake setting and the associated target deceleration of the aircraft at that autobrake setting.

In one embodiment, the system is configured to calculate different simulated landing distances based on the coefficient of friction between braked airplane tires and the runway. This coefficient of friction can vary based on a number of factors that can be included in the calculation (e.g. runway construction material, temperature of the outside air, temperature of the runway surface, barometric pressure, atmospheric pressure, contamination, aircraft braking system). The calculation of the coefficient of friction can be based on logged samples of aircraft landings for different landing conditions that are averaged together, a friction sampling device that can be used on a runway to simulate a landing aircraft, and or any preferred method and system of determining the wheel braking coefficient of friction.

In another embodiment, the system is configured to further take into account in the calculation of the simulated landing distance other structure and means used to decelerate the aircraft during the landing procedure (e.g. flaps, wheel spin up on landing, landing flare, round-out, spoilers, reverse thrust, contaminant impingement, contaminant drag, relative wind velocity).

Any system and or method of calculating the simulated landing distance including any preferred factors consistent with the desired use is contemplated.

The system can be further configured to calculate an actual rate of deceleration based on information from NEMS or equivalent. In one embodiment, the system calculates by any known or devised method an actual rate of deceleration for a set time interval(s) based on an initial velocity of the aircraft at the start of the time interval, a final velocity of the aircraft at the end of the time interval, and the length of the time interval. In one version, the time interval is the total amount of time the landing procedure takes. In another version, the time interval can be a predetermined amount of time, such as every second or minute, etc., during the landing procedure. Any system and or method for determining the actual rate of deceleration consistent with the desired use is considered.

The system can calculate a simulated rate of deceleration based on information from NEMS and or other sources. In one embodiment, the system is configured to include at least one of a predicted autobrake rate of deceleration, a simulated coefficient of braking friction between the runway and the aircraft tire based on the factors described above, other structure and means used to decelerate the aircraft during the landing procedure (e.g. flaps, wheel spin up on landing, landing flare, round-out, spoilers, reverse thrust, contaminant impingement, contaminant drag, relative wind velocity), and any other desired factors that affect deceleration of the aircraft during the landing procedure.

The system can also be configured to compare an actual ground speed based on information from NEMS and or other sources and a desired ground speed. In one embodiment, the system is configured to include other factors that influence an aircraft's ground speed in determining the difference. The factors can include a coefficient of friction, or tire braking, between the runway and the aircraft tire based on the factors described above and or other structure and means used to decelerate the aircraft during the landing procedure (e.g. flaps, wheel spin up on landing, landing flare, round-out, spoilers, reverse thrust, contaminant impingement, contaminant drag, relative wind velocity). Any factors that may influence ground speed are hereby contemplated.

The system can further be configured to compare an actual touchdown location based on information from NEMS and or other sources and a desired touchdown location. The location of the desired touchdown location can come from an air traffic controller, the aircraft pilot, and or any other suitable source.

The system can be configured to calculate the difference between any or all of the following: the actual incremental rates of deceleration and the simulated rate of deceleration; the difference between the actual landing distance and the simulated landing distance; the difference between the actual ground speeds and the desired ground speed; and the difference between the actual touchdown location and the desired touchdown location. For ease of explanation, the rate of deceleration difference will be discussed below but the same embodiments can be applied to the any of the differences discussed above.

In one embodiment, the system includes a preset rate of deceleration difference tolerance and sends a warning to the user when the calculated difference exceeds the tolerance. In one version of this embodiment, the preset rate of deceleration difference tolerance is initially entered by a programmer and cannot be adjusted by the user(s). In another version, the preset rate of deceleration difference tolerance is adjustable by the user(s). In yet another version, the preset rate of deceleration difference tolerance can vary based on any of a number of factors (e.g. aircraft type/model, atmospheric pressure, weather condition, coefficient of friction or tire braking between the airplane tire and the runway). In a further version, the system comprises two tolerances, where one tolerance is higher than the other. This version can further be configured to issue different warnings based on which tolerance is exceeded.

Any system and or method of setting the tolerance are contemplated.

In one version the system will alert the Airport Operations Team and the Airport Air traffic Control Team that there may be a runway safety concern and supply the location of where the problem might be. The Airport Maintenance Team might be alerted that an anomalous deceleration or directional control of an aircraft has taken place on a certain area of the runway. Further the Air Traffic Control Team might be similarly alerted and receive from the system a suggestion or request to ask the pilot of the subject aircraft if they have done anything (like switched off autobraking by engaging manual braking) or noticed anything that may have caused the aircraft to not decelerate as the system predicted the autobrake was programmed to, and or the aircraft has not been directionally controlled within a predetermined safe path on the runway.

In one version, the warning to various stakeholders can comprise a constant audible sound (e.g. beep, chirp, buzzer). In another version, the warning can comprise a repeating audible sound. In a further version, the warning can comprise a blinking or flashing light. In a yet further version, the warning can comprise an activated constant light. In yet another version, the warning can comprise a combination of the audible and light warnings described above. In a further version, the warning can comprise an alert or "pop-up" containing information about the aircraft. This information can include the location (e.g. runway, latitude, longitude), time (in local time format), aircraft ID, flight ID, and/or any other desired information. The warning can comprise any audible, visual, digital and/or other preferred type of configuration consistent with the desired purpose. The warning may include at least one of the following: a color-coded range overlaid on a map to visually identify areas to be inspected/assessed, a Short Message Service (SMS) and an e-mail message.

In one version, the alert or warning will continue or repeat until a user deactivates it. In another version, the warning will deactivate after a predetermined amount of time has passed. Any method or system of operation of the warning consistent with the desired purpose is contemplated.

Figure 2:
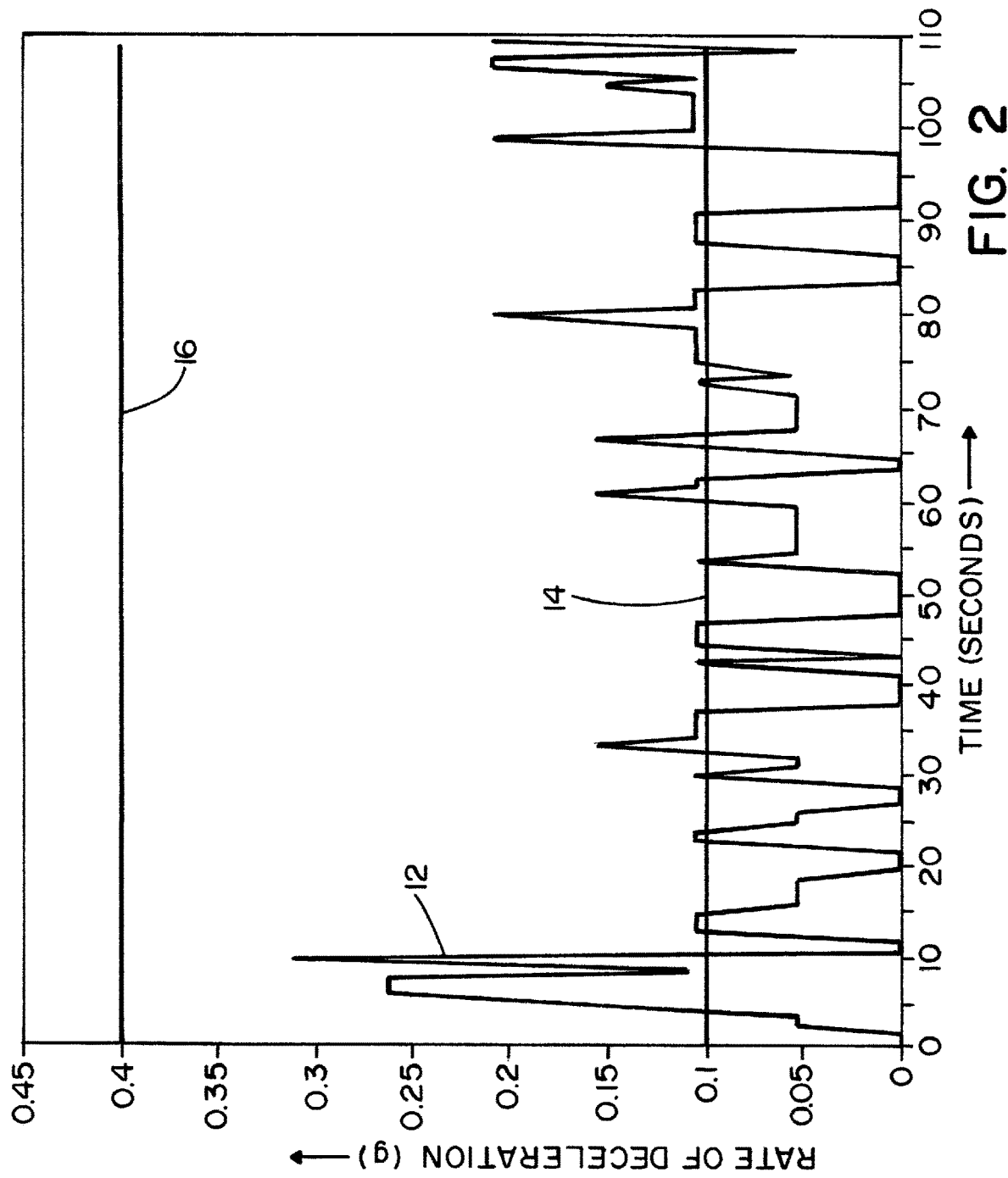
FIG. 2 is an output graph produced by an embodiment of the present invention.
Figure 3:
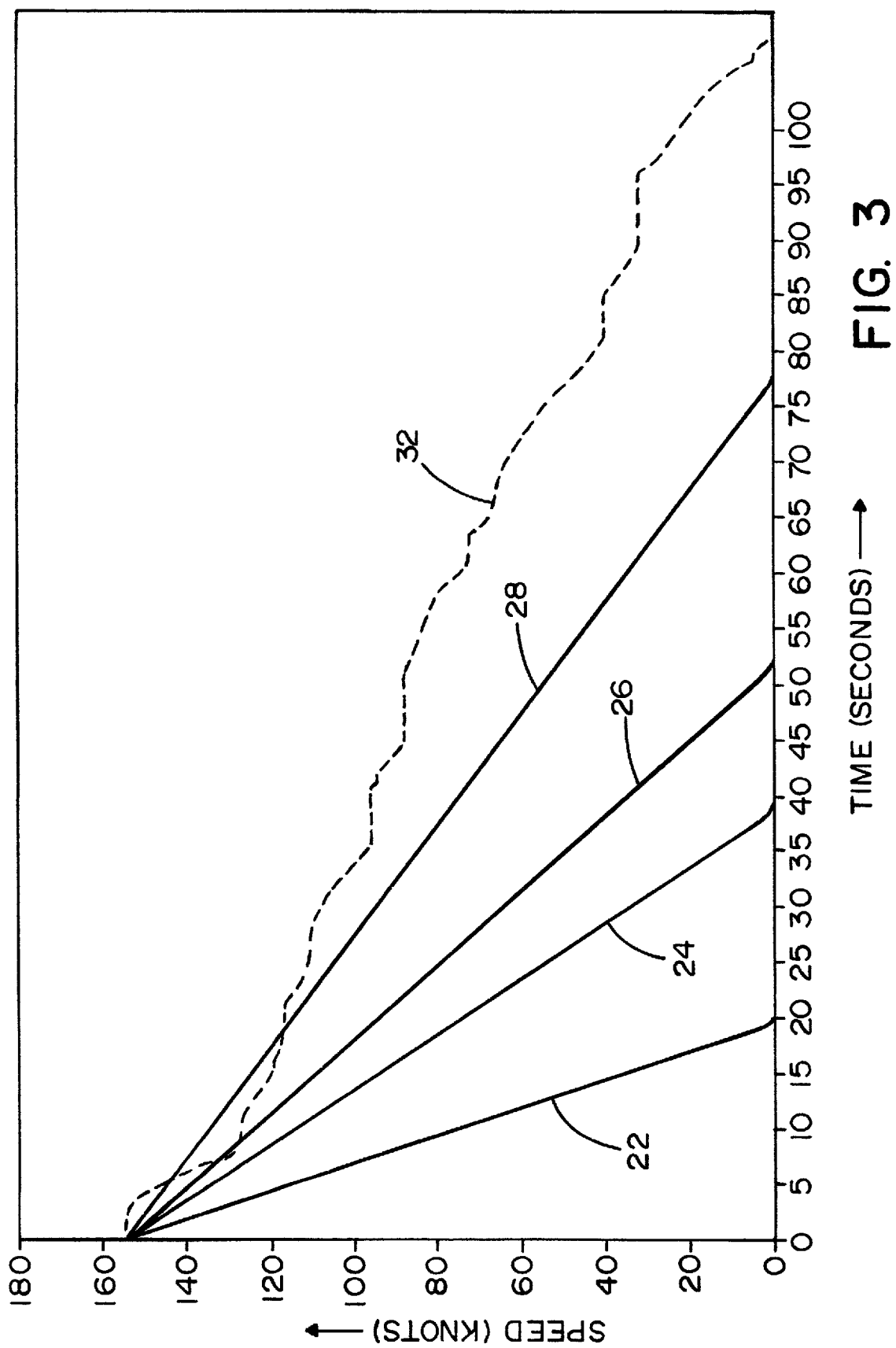
FIG. 3 is a second output graph produced by an embodiment of the present invention.

In another embodiment, the system can be configured to create a summary based on the information generated. For example, the summary can comprise a graph(s), a chart(s), a table(s), an animation(s), a video(s) and/or any combination of desired outputs. The summary can be displayed in an airport operations vehicle or device, a local or remote air traffic control tower, a separate monitoring computer, or any preferred location or combination of locations consistent with the desired purpose In one example, a line graph displays an actual rate of deceleration over time 12 and a simulated rate of deceleration over time. As shown in FIG. 2, in one version the graph can further include a line 14 for the rate of deceleration for a minimum setting on an autobrake and a line 16 for a maximum setting on the autobrake. In another embodiment, a line graph displays a speed of the aircraft over time. As shown in FIG. 3, in one version the graph can also include an aircraft simulated speed over time for each of the autobrake settings, i.e. line 22 for autobrake setting 1, a line 24 for autobrake setting 2, a line 26 for autobrake setting 3, a line 28 for a maximum autobrake setting and a line 32 for an observed aircraft speed. The graphs can be displayed in an air traffic control tower, a separate monitoring computer, or any preferred location or combination of locations consistent with the desired purpose.

In a further embodiment, the system can incorporate the calculated rate of deceleration difference discussed above onto a graphical map of a runway to illustrate the experienced deceleration on sections of the runway. Such a graphical representation can readily illustrate potential "trouble spots" on the airport runway that can be addressed by the appropriate personnel. This can include a color coded graphical view overlaid on top of an airport map. For example, where a rate of deceleration difference exceeds a tolerance the system can, based on the gathered location data from NEMS, mark the section of the runway the aircraft landed on. This section can be marked in any desired manner (e.g. different color, outlined, different pattern). In one version, when multiple tolerances are used different markings can be used depending on which tolerance is exceeded. In another version, different markings can be used whether the landing distance difference, the rate of deceleration difference, the ground speed difference, the path taken by the aircraft, and or the touchdown difference exceeds their respective tolerances. In one embodiment, the system includes a map of the runways of a select airport, marks the section of the runway as described above, and transfers the marked runways to a receiver in an airport control tower or any other suitable location for a user to view. The map of the runways for an airport can be obtained from any suitable source for mapping the sections. In another version, the sections can be marked on a pre-existing runway map in the airport control or any other suitable location. Any means and/or method of marking a runway map suitable for the desired use are hereby contemplated.

In a yet further embodiment, an icon of the aircraft on a radar map of the airport can be marked or animated when the calculated landing distance difference, the rate of deceleration difference, the ground speed difference, and or the touchdown difference discussed above exceeds a tolerance. In one version, the marking can comprise changing the color of the airplane icon. In another version, the marking can comprise an additional symbol or icon located adjacent the airplane icon. In a further version, the marking can comprise a "pop-up" that appears when a cursor is placed on or adjacent the airplane icon. Any marking corresponding to an icon of the aircraft consistent with the desired use is contemplated.

In another embodiment, the system is configured to store in a database at least some of the information discussed above. In one version, the information is stored in one database. In another version, separate databases are used for separate pieces of information. In a further version, information for a selected past amount of time is stored in the database and information that is older than the selected amount of time is deleted. In a yet further version, the database is searchable allowing a user to filter results based on different factors (e.g. date, time, weather, airport, runway identification, aircraft brand, aircraft model, range of deceleration rate, range of landing distance, runway condition reports, NOTAMS). Any method or system for storing the information is hereby contemplated.

In an embodiment, the present invention comprises a method for capturing actual surface movement events of an aircraft and comparing data from the event to a simulated or anticipated version of the event. Such a method can be embodied in a software program to be performed on a computer processor. For example, in one embodiment, the method comprises capturing surface movement events of an aircraft and analyzing the surface movement events in near real time to detect anomalies in a speed, landing distance, steering, and rate of deceleration of the aircraft. In another embodiment, the method comprises capturing surface movement events of the airplane, logging the surface movement events, and analyzing the surface movement events to detect anomalies in the speed, landing distance, steering and rate of deceleration of aircrafts.

In another embodiment, the invention records the time from when an aircraft leaves the anti-icing area to when the takeoff is initiated and can be reported to flight and de-icing crews before actual takeoff. This will warn them if the maximum holdover time for anti-icing chemicals in the current conditions is likely to be exceeded.

The method can comprise a step of connecting the system to the SWIM or similar framework. In one version, the method comprises directly connecting the system to the SWIM framework via a cable network. In another version, the method comprises connecting the system to the SWIM framework via a wireless or cellular network. This step can be completed by any means consistent with the desired purpose.

The method can further comprise a step of collecting aircraft information from the SWIM or similar framework via the connection. In one version, the method further comprises searching for and or filtering specific data to be collected. In another version, the method further comprises collecting all available information from the SWIM framework. Collecting any amount of available information is hereby contemplated.

The method can also comprise a step of logging a touchdown position of the aircraft from the SWIM or similar framework when the aircraft begins a landing procedure. In one version, the logging can occur simultaneously with the SWIM or similar framework logging the touchdown position. In another version, the logging can occur after the landing procedure has been completed. Any time of logging the touchdown position of the aircraft is hereby contemplated.

The method can comprise a step of logging a velocity of the aircraft from the SWIM or similar framework over points of time during the landing procedure. In one version, the velocity of the aircraft is logged at every second of the landing procedure when possible. In another version, the velocity of the aircraft is logged at every minute or other segment of time of the landing procedure. The velocity of the aircraft logged at any selected time interval is hereby contemplated.

The method can also comprise a step of logging a final position of the aircraft from the SWIM or similar framework at the end of the landing procedure. In one version, the logging can occur simultaneously with the SWIM framework logging the final position. In another version, the logging can occur at a selected amount of time after the SWIM framework logs the final position. Any time of logging the final position of the aircraft is hereby contemplated.

The method can further comprise a step of calculating certain information regarding the actual landing procedure. For example, the information can comprise an actual rate of deceleration, an actual landing distance, an actual ground speed, an actual steered path and or any preferred data. In one version, the actual rate of deceleration can be calculated instantaneously each time the velocity of the aircraft is logged. In another version, the actual rate of deceleration can be calculated once the landing procedure is finished. The actual rates of deceleration or airplane path can be calculated at any time consistent with the desired use.

In one version, the actual landing distance is calculated instantaneously with the SWIM framework logging the final position of the aircraft by calculating the distance between the touchdown point and the final position. In another version, the actual landing distance is calculated a selected amount of time after the SWIM framework logs the final position. The actual landing distance can be calculated at any time consistent with the desired use.

The method can yet further comprise a step of calculating a simulated or anticipated landing procedure based on information from the SWIM framework and or other data sources. The simulated landing procedure can comprise a simulated rate of deceleration, a simulated landing distance, a simulated ground speed, an airplane path, and or a simulated touchdown point. The simulated landing procedure can comprise any desired information based on information from the SWIM framework and/or other data sources.

The method can also comprise a step of comparing data from the simulated landing procedure to data from the actual landing procedure. For example, the actual landing distance can be compared to the simulated landing distance to find a landing distance difference; the actual rate of deceleration can be compared to the simulated rate of deceleration to find a rate of deceleration difference; the actual path of the aircraft on the pavement can be compared to the simulated or anticipated path; and so on. In one version, the method further comprises a step of comparing the difference to a predetermined tolerance. Where the difference exceeds the predetermined tolerance, a warning, of the type described above, can be issued. Alternatively, a section of the runway where the landing procedure occurred can be altered to signal a possible issue.

The method can yet further comprise a step of generating a summary of the comparison. For example, the summary can comprise a graph comparing the simulated landing distance to the actual landing. In another example, the summary can comprise a data sheet compiling the actual aircraft velocities at selected intervals next to the simulated aircraft velocities for those same intervals. This summary can take a form desired by a user or as programmed.

The method can also comprise a step of comparing data from a simulated aircraft ground movement procedure to data from the actual aircraft ground movement procedure. For example, the actual aircraft ground movement can be compared to the simulated aircraft ground movement to find a difference; and so on. In one version, the method further comprises a step of comparing the difference to a predetermined route or time to complete route or activity tolerance. Where the difference exceeds the predetermined tolerance, an alert can be issued. Alternatively, airfield operations management might determine new or different approach to best management practices in aircraft ground movements.

The method can yet further comprise a step of generating a summary of the comparison. For example, the summary can comprise a graph comparing the simulated aircraft ground movement to the actual aircraft ground movement. In another example, the summary can comprise a data sheet compiling the actual aircraft ground movement at selected intervals next to the simulated aircraft ground movements for those same intervals. This summary can take a form desired by a user or as programmed.

Figure 4:
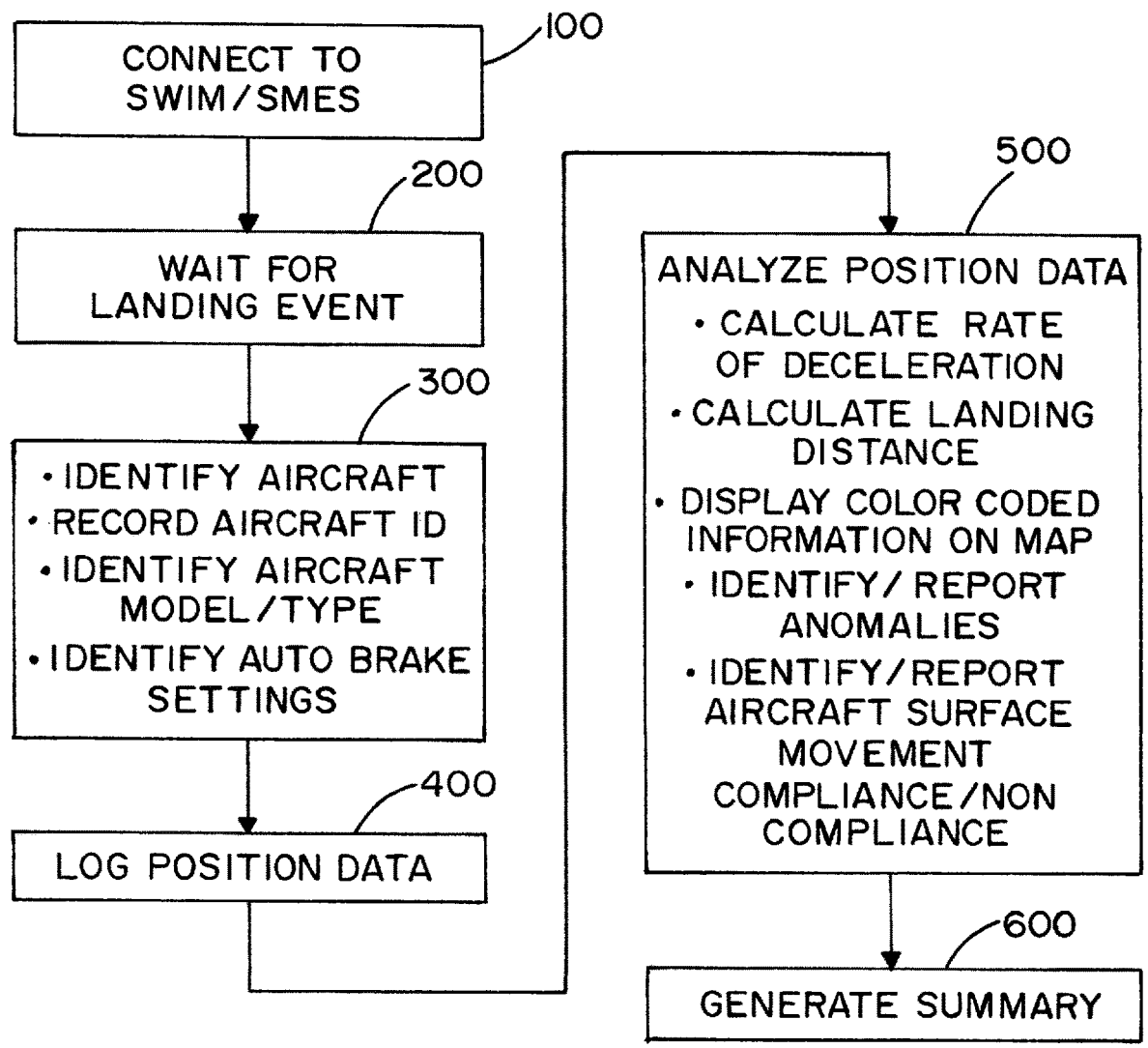
FIG. 4 is a flow chart illustrating the method of the present invention.

As illustrated in FIG. 4, the present invention may include a step 100 of connecting to SWIM/SMES or equivalent, a step 200 of waiting for a landing event, a step 300 of identifying an aircraft, a step 400 of logging position data for the aircraft, a step 500 of analyzing the position data and a step 600 of generating a summary that is communicated to an operator indicative of the aircraft being outside of an acceptable operating performance range. As illustrated in FIG. 4, the step 300 of identifying the aircraft may include recording an aircraft identification number, identifying a type/model of the aircraft and identifying a present setting of the auto brake of the aircraft during a landing process. The step 500 of analyzing the position data may include calculating a rate of deceleration of the aircraft, calculating a landing distance for the aircraft, displaying a color-coded information on a map, identifying or reporting anomalies and identifying or reporting aircraft surface movement compliance or non-compliance.

It is contemplated that the present invention may provide the following:

A software program capturing global aircraft surface movement events characterized by a method for detecting anomalies in aircraft parameters including at least one of: Aircraft velocities, Landing distance, Rate of deceleration of aircraft, Touchdown location, Aircraft routes, Timing of aircraft routes, and Ground movement activities;

A software program logging aircraft surface movement for historical review/query;

A software program that employs machine learning and artificial intelligence to self-monitor and improve;

A software program capturing surface movement events characterized by a method for calculating at least one of the following: Observed landing distance, Observed rates or average rates of deceleration for the part of the runway used during landing (as measured from the start of the runway), Observed rates, or average rates of deceleration by third of runway (if a whole third is used during the landing), Observed rates or average rates of deceleration geo-localized for each measurement and Observed aircraft ground movements;

A software program capturing aircraft surface movement events characterized by a method for representing at least one of the following: Observed rates of deceleration using a color-coded range overlaid on a map to visually identify areas to be inspected/assessed, and Capability to filter aircraft track(s) or path(s) by at least one of the following criteria: Date, Time, Weather, Reported Runway Conditions, Runway Identification, Aircraft Brand, Aircraft Model, Range of Deceleration rate, Range(s) of Landing distance, and Position(s) of aircraft on airport pavements/grounds;

A software program capturing aircraft surface movement events characterized by a method for tracking at least one of the following: Out of range rate(s) of deceleration based on the tracked aircraft, Aircraft type and expected range(s) of deceleration rate, and Aircraft ground movement anomalies;

A software program comprising machine-learning or an algorithm configured for identifying, ignoring or noting the various common deceleration forces, like wheel spin up on landing, aerodynamic flaps, spoilers, reverse thrust, and contaminant impingement, and contaminant drag, and determining if these acceleration/deceleration forces fall respectively within, or outside expected parameters;

A software program analyzing touchdown location and reporting on "out of normal" range when detected;

A software program analyzing aircraft landing stopping distances and reporting possible increased stopping distances due to build-up of rubber or deteriorating pavement macro or micro-texture;

A software program that confirms aircraft ground movements, including but not limited to landings, takeoffs, and rejected takeoffs, are within or outside acceptable operational tolerances;

A software system configured for learning and teaching another system configured for artificial intelligence capable operation; and A software system that can silently, autonomously, or by manning, globally monitor aircraft landings and aircraft surface movements and provide alerts and warnings for landings or any aircraft surface movements falling outside of tolerances and or inputted expectations.

The methods or algorithms described in connection with the examples disclosed herein may be embodied directly in hardware, in software (e.g., as executable by a processor or other computer components), or in a combination of both, in the form of processing unit, programming instructions, or other directions, and may be contained in a single device or distributed across multiple devices. A software module may reside in random access memory (RAM), flash memory, read-only memory (ROM), electrically programmable read-only memory (EPROM), electrically erasable programmable read-only memory (EEPROM), registers, hard disk, a removable disk, a compact disc read-only memory (CD-ROM), or any other form of storage medium known in the art. Such a storage medium may be coupled to a processor such that the processor can read information from, and write information to, the storage medium. In the alternative, the storage medium may be integral with the processor.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for detecting and reporting anomalies during operation of an aircraft, the method comprising the steps of:
    receiving, from an Automatic Dependent Surveillance-Broadcast (ADS-B), real time data indicative of operation of the aircraft, the real time data including at least one of the following :
    ground speed, rate of deceleration of the aircraft, touchdown location, position of the aircraft as it travels down a runway, timing of a route the aircraft travels, ground movement activities, and a maximum landing distance;
    based on the received real time data, calculating a predicted performance of the aircraft;
    generating, in real-time, an alert when the predicted performance exceeds a predetermined threshold;
    performing, responsive to the alert, one or more actions, wherein the one or more actions comprises informing an air traffic control team and/or an airport operations team that an anomalous deceleration or directional control of the aircraft has taken place on a certain area of the runway when the predicted performance exceeds the predetermined threshold;
    generating one or more additional alerts when a landing distance difference exceeds a second predetermined threshold, and/or when a ground speed difference exceeds a third predetermined threshold, and/or when a touchdown difference exceeds a fourth predetermined threshold,
    overlaying a graphical view on an airport map; and
    marking, on the graphical view, one or more sections of the runway the aircraft landed on when the predicted performance exceeds the predetermined threshold, and/or when the landing distance difference exceeds the second predetermined threshold, and/or when the ground speed difference exceeds the third predetermined threshold, and/or when the touchdown difference exceeds the fourth predetermined threshold.

2. The method of claim 1, wherein the predicted performance includes an average rate of deceleration.

3. The method of claim 1, wherein the predetermined threshold comprises a preset rate of deceleration difference and is adjustable.

4. The method of claim 1, wherein the alert includes at least one of the following: a color-coded range overlaid on the airport map to visually identify areas relative to the runway to be inspected/assessed, a Short Message Service (SMS), and e-mail message.

5. The method of claim 1, wherein the real time data includes at least one of the following: date, time, runway identification, aircraft brand, aircraft model, range of deceleration rate, range of landing distance, and a position of the aircraft on airport pavements/grounds.

6. The method of claim 1, wherein the one or more actions comprises:
    informing, based on the predicted performance exceeding the predetermined threshold, the air traffic control team and/or the airport operations team of an occurrence of a runway safety concern; and
    supplying, based on the informing, a location of the runway safety concern.

7. The method of claim 1, wherein the real time data includes at least one of the following: wheel spin up on landing, aerodynamic flaps position, spoiler position, reverse thrust engagement time and intensity, and contaminant impingement on a land surface.

8. The method of claim 1, wherein the one or more actions comprises:
    requesting, from a pilot of the aircraft and when the predicted performance exceeds the predetermined threshold, a type of braking that was engaged; and
    receiving, from the pilot and responsive to the requesting, a response indicative of the type of braking that was engaged.

9. The method of claim 1 wherein the step of generating the alert includes utilizing machine learning and artificial intelligence to determine an autobrake setting.

* * * * *